July 19, 1927.
G. A. GALLOWITZ
1,636,412
METALLIC CORNER
Original Filed Oct. 4, 1924
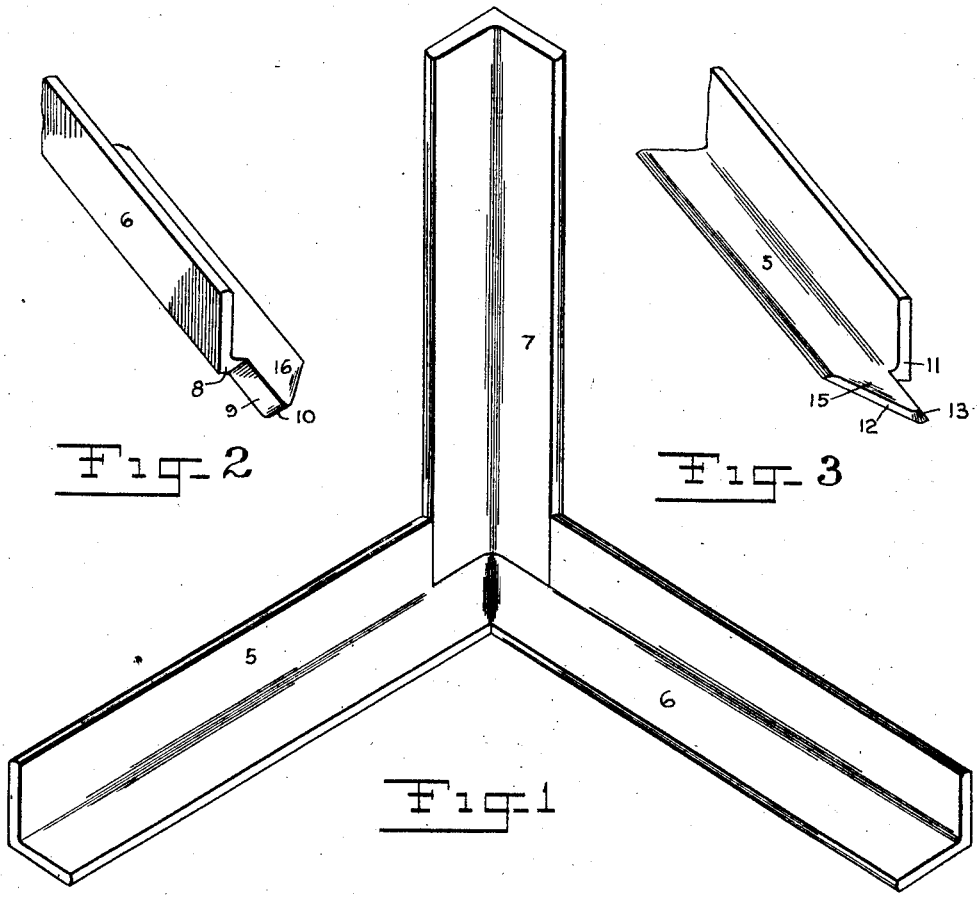
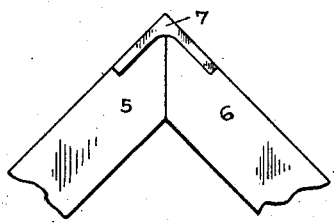
Inventor Patented July 19, 1927.

1,636,412

UNITED STATES PATENT OFFICE.

GUSTAVE A. GALLOWITZ, OF NEW YORK, N. Y., ASSIGNOR TO KNY-SCHEERER CORPORATION OF AMERICA, OF NEW YORK, N. Y., A CORPORATION OF NEW YORK.

METALLIC CORNER.

Original application filed October 4, 1924, Serial No. 741,747. Divided and this application filed December 4, 1925. Serial No. 73,113.

This application is filed as a divisional application of applicant's application Serial #741,747 on his process of forming a metallic corner and the product, which was filed October 4, 1924, and in which application the examiner required a division by action of December 18, 1924. All rights and dates in connection with said parent application are therefore claimed in connection with this divisional application filed to cover the product of said parent application in accordance with said requirement of the examiner.

This invention relates to an improvement in a metallic corner and the novelty consists in the adaptation and arrangement of parts as will be more fully hereinafter pointed out.

The welding of a metallic corner is not new and such welding has been done for many years in the making of metal cabinets and in similar construction where the making of a metallic corner becomes necessary. But such corners have been formed in the case of corners formed of angle irons by two of the angle irons being bevelled so as to fit together and the third being mounted on the upper edges of said joined angle irons whereby a corner is formed but there is no actual meeting of the three members at one point nor is there any homogeneous corner whereby all of the members are fused integrally.

There is, therefore, a serious problem of forming a metallic corner so as to have all of the strains radiate from a common point which is the apex of the corner whereby maximum strength may be insured, an increase in the welding area also obtained providing the greatest amount of fusing and a proper interlocking of the three angle irons or members meeting at the corner so as to form a homogeneous corner in which all members are fused integrally with an even distribution of heat during the welding thereby furnishing a corner which is absolutely smooth on the inside and outside without any interruption to the vision particularly when such corners are used for exhibition cabinets. My process and product has solved all of these problems furnishing a process whereby three angle irons or metallic members can be welded together by the notching or cutting of only two so that the third is intact thereby furnishing the greatest strength to said corner.

Referring to the drawings Figure 1 is a perspective of my metallic corner. Figure 2 is a perspective of one angle iron cut ready for use. Figure 3 is a perspective of the second angle iron cut ready for use. Figure 4 is a bottom plan view of the corner shown in Figure 1.

In the drawings 5 is an angle iron having a portion stamped or died out at 11 and having a pointed portion 15 with a bevelled face 12 and a bevelled face 13 cut at the same time. A second angle iron 6 also has a portion stamped or died out at 8 and having a pointed portion 16 with a bevelled face 9 and a bevelled face 10 cut at the same time. A third angle iron 7 having a square end is adapted to fit the stamped out parts 8 of angle iron 6 and 11 of angle iron 5 as bevelled edges 10 and 12 are placed together as shown in Figures 1 and 4.

I first stamp or die out angle irons 5 and 6 in the length required simultaneously forming pointed portions 15 and 16 respectively and two bevelled faces 12 and 13 and the beveled faces 9 and 10 respectively.

These stamped angle irons 5 and 6 are then placed with the bevelled edges 12 and 10 together as shown in Figures 1 and 4 and the third angle iron 7 is placed as there shown so that the bevelled edges 9 and 13 contact with the inside face of said angle iron 7.

The angle irons 5, 6 and 7 will then be rigidly secured together in the positions as shown in Figure 1 whereupon the welding heat will be applied in the usual well known manner on the inside of said corner as shown in Figure 1 together with the welding stick customarily used in such welding operations and as the heat is applied and the welding stick is fused an opening 14 at the very apex of the corner will be thereby filled together with the space between the bevelled edges 9 and 13 and the face of 7, and as the welding process proceeds as usual the metals of 5, 6 and 7 together with the metal of the welding stick will all be fused, the heat of the welding being equally fused between all three angle irons 5, 6 and 7 which meet at the common apex thereby effecting an even heating and fusing of all parts as the welding heat can be applied at or so near the apex that the heat spreads evenly in all directions and through the contacting portions of the angle irons 5, 6 and 7.

When the metal of the angle irons 5, 6 and 7 begins to actually fuse these are turned, in their rigid position forming a corner from the position shown in Figure 1, to the position shown in Figure 4 so that the welding heat and welding stick can be applied to the groove formed by bevelled faces 10 and 12 and the meeting edges of 5, 6 and 7 applying said welding heat until the fusing of angle irons 5, 6 and 7 is completed whereby a metallic corner which is smooth faced inside and out is formed.

The formation of a perfectly welded corner as described may be applied to suitable metal pieces of any desired length and a series of said corners formed as may be desired whereby a museum cabinet of sufficient length, breadth and depth may be formed for the exhibition of the largest specimens, said metal frame being substantially narrow but sufficiently strong to hold the large plates of glass necessary to furnish a clear vision to the observer. The construction of corners of such strength permits the use of not only comparatively narrow angle irons but makes it possible to use angle irons of medium weight or thickness the construction of said corners furnishing sufficient strength so that even large swinging doors may be carried by frames constructed of corners made in accordance with my process.

I claim:

1. A new product comprising a metallic welded corner being absolutely smooth inside and outside and composed of three angle irons positively interlocked from the apex of the corner, the angle iron at the apex of the corner being uncut and the strains radiating from said apex.

2. A new product comprising a metallic welded corner being absolutely smooth inside and outside and composed of three angle irons positively interlocked from the apex of the corner.

3. A new product comprising a metallic welded corner being absolutely smooth inside and outside and composed of two notched angle irons and a third angle iron uncut and fitting the first two to form said corner.

In testimony whereof I affix my signature.

GUSTAVE A. GALLOWITZ.